Oct. 22, 1940. H. D. HUME ET AL Re. 21,604

HARVESTER

Original Filed Nov. 18, 1935

JAMES E. LOVE
HORACE D. HUME
INVENTOR

BY Herbert G. Smith
ATTORNEY

Reissued Oct. 22, 1940

Re. 21,604

UNITED STATES PATENT OFFICE 21,604

HARVESTER

Horace D. Hume and James E. Love, Garfield, Wash., assignors to Hume-Love Company, Garfield, Wash., a corporation Original No. 2,102,710, dated December 21, 1937, Serial No. 50,389, November 18, 1935. Application for reissue December 18, 1939, Serial No. 311,924

2 Claims. (Cl. 56—158)

Our present invention relates to improvements in harvesters or mowers of the sickle, or front, outwardly-set, reciprocating cutter type, with which is combined a draper, or conveyer located at the rear of the sickle and disposed transversely of the implement. The draper or endless-belt conveyer is mounted on a draper frame that may be hinged or adjustably supported by the main frame of the implement, and the cutter or sickle is suspended from the draper frame to provide freedom of movement within a limited range of the reciprocating cutter in order to compensate for irregularities in the surface of the ground over which the implement is advancing. The draper and its frame may remain in stationary position with relation to the implement, while the sickle or reciprocating cutter is supported from or suspended from the draper frame for upward and downward movement.

By the combination and arrangement of parts according to our invention, the cutter bar or sickle is disposed in operative position close to the ground for effective work, and the whole of the cut crop is cleanly and neatly passed rearwardly and upwardly to the draper and conveyed thereby to other parts of the implement or disposed of in suitable manner. The implement is effective not only for harvesting standing grain, but is also specially adapted for cutting down or fallen grain, vines, and other crops that lie close to the ground.

Our invention consists in certain novel combinations and arrangements of parts as will hereinafter be more fully set forth and claimed.

In the accompanying drawing we have illustrated one complete example of the physical embodiment of our invention in which the parts are combined and arranged according to one mode we have so far devised for the practical application of the principles of our invention, but it will be understood that changes and alterations may be made in these exemplifying structures, within the scope of our claims, without departing from the principles of our invention.

Figure 1:
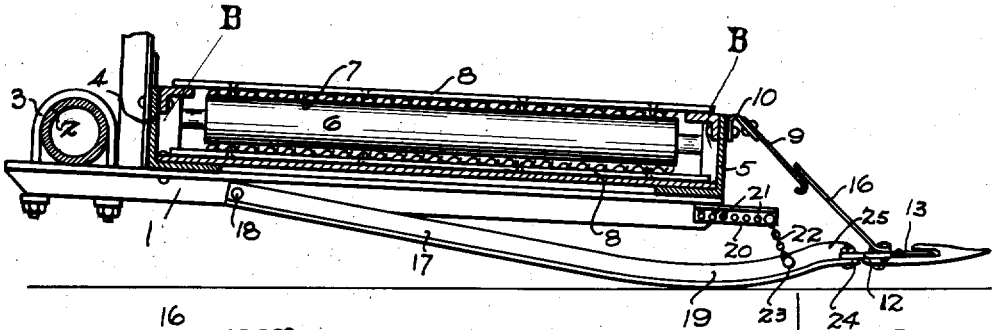
Figure 2:
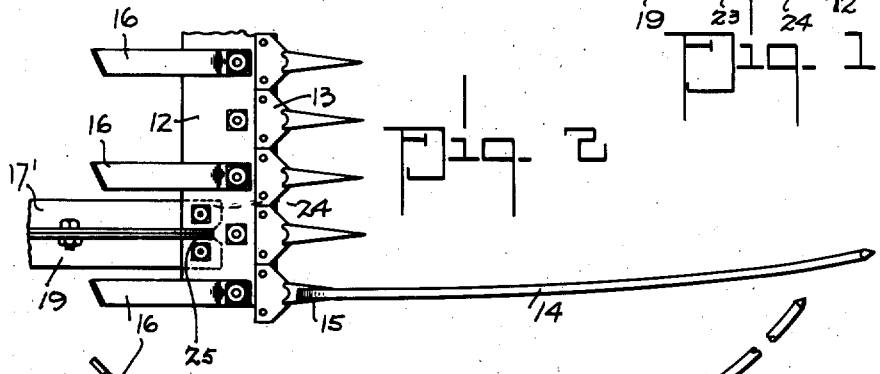
Figure 3:
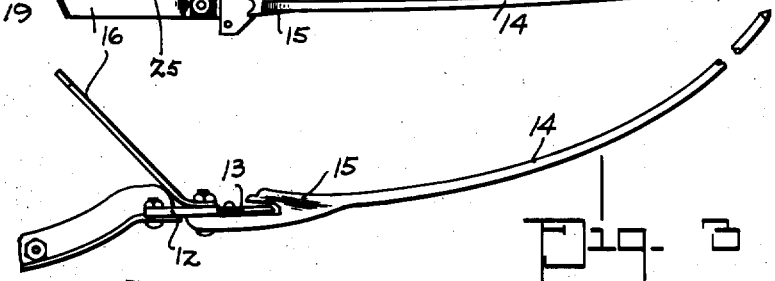
Figure 5:
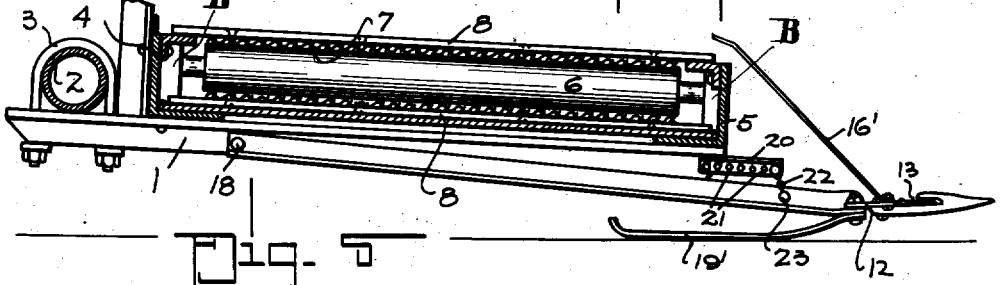
Figure 4:
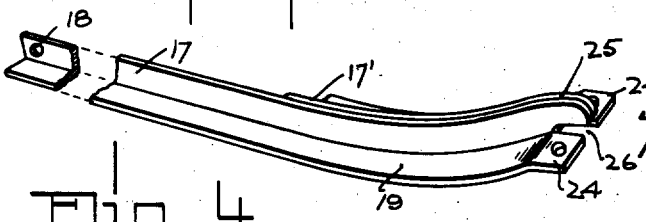

Figure 1 is a view showing the draper frame with the draper in transverse section, and illustrating the sickle and the means by which it is mounted or suspended from the draper frame and supported on the surface of the ground, Figure 2 is a fragmentary, top plan view, at the outer end of the cutter bar, showing its supporting arm, and also a guide bar which guides excess grain out of the swathe to be cut, Figure 3 is a perspective view showing the forwardly and upwardly projecting guide bar mounted on the cutter bar, one of the tines over which the cut grain is passed to the draper, and a portion of the supporting arm for the cutter bar, Figure 4 is a broken view in perspective of the supporting arm, and Figure 5 is a view similar to Figure 1 but with a slightly modified arrangement of the supporting arm, and of the tines.

The draper frame 1, which is or may be of rectangular shape and disposed above the ground at a slight forwardly declining angle, is supported on a tubular frame bar 2 that extends transversely of the implement, and the frame is attached to the bar as by U-bolts 3. On top of the draper frame are fixed a pair of parallel angle bars 4 and 5 which extend transversely of the implement, and the usual rollers 6 for the draper 7 are journaled in bearing blocks B mounted in these front and rear bars. The draper is of the endless belt type, preferably of canvas, and it is provided with spaced slats 8 that assist in conveying the cut grain transversely of the implement as it is received from the apron 9 of Figure 1.

The apron 9 in Figure 1 may take the form of a sheet metal plate that is attached or fastened at 10 at the top front edge of the draper frame, the upper edge of the apron being approximately flush with the top of the draper, and the apron projects forwardly of the frame and declines therefrom at an angle of approximately forty-five degrees, more or less.

The cutter bar 12, with its reciprocating teeth 13, is connected at its inner, or implement-end, in suitable manner, and usual mechanism is employed for reciprocating the cutter. As indicated in Figures 1 and 5, the cutter bar lies close to the surface of the ground in advance of the draper and the draper frame, and normally below the plane of the draper frame.

To separate grain from the swathe to be cut, to lift the fallen crop, and to prevent crushing of the crop outside of the swathe to be cut, we provide a guard-finger, guide bar, or separator 14, which is rigidly fastened, as by welding, at 15, to a finger guard of the cutter bar. This separator as indicated, projects forwardly in advance of the cutter bar, and it curves upwardly and inwardly toward its free end, so that the advancing separator entering the grain, will gradually push some of the grain from the outer edge of the swathe, and separate the grain to be cut therefrom in order that a well-defined line of cleavage may be made by the cutter in the swathe, without unnecessary loss of the crop. The upward curve of the separator tends to lift and hold erect the fallen grain and guides the grain to the cutter, while the lateral curve in the separator tends to pass the separated grain outwardly and away from the cutter, thus preventing an excess of grain in front of the cutter that would result in tangling the crop and clogging of the cutter.

As the grain is cut, the cut grain rides upwardly and rearwardly from the cutter over a row of tines or fingers 16 that are spaced at regular intervals with their front ends attached at the rear edge of the cutter bar. These tines are inclined on approximately the same angle as the apron 9, and the rear, free ends of the tines overlap the front or lower edge of the apron so that the cut grain may ride smoothly up over the tines and the apron and be deposited on the draper.

At its outer end, and at spaced intervals with long cutter bars, the cutter bar is supported by means of arms 17. The rear end of such an arm is pivoted at 18 to the draper frame, and this arm is fashioned with a rounded or convex shoe portion 19 that frictionally engages and slides over the surface of the ground as the implement advances. The pivotal support 18 at the rear end of the arm is located toward the rear of the draper frame and the arm extends forward, declining to the ground below the frame, the bowed or curved shoe portion of the arm being located approximately below the front edge of the draper frame, and at the rear of the cutter bar.

Above the shoe or runner 19 of the pivoted bar or arm 17, a bracket arm 20 is fastened to and projects in front of the draper frame, and this bracket arm is fashioned with a series of spaced bolt holes 21, for the attachment of a chain 22, which chain is also attached at 23 to the supporting arm at the rear of the cutter bar. By means of the series of bolt holes in the bracket arm and the chain, the suspended arm may be adjusted with relation to the draper frame, and as the cutter bar is fastened to the front end of the supporting arm, the cutter bar is also adjusted, with the supporting arm, with relation to the surface of the ground.

As indicated in Figure 4, the supporting arm, which is fashioned of an angle bar, at its front end is provided with a reinforcing angle bar 17' rigidly attached to the supporting arm, and the front end of the supporting arm is fashioned with spaced perforated lugs 24, and an overhanging head 25, which form a notch 26. This notched-head of the supporting arm is slipped over the rear edge of the cutter bar, and the lugs 24 are securely bolted to the cutter bar to provide a rigid and secure fastening between the supporting arm and the cutter bar. The supporting arm thus provides a rearwardly pivoted support for the cutter bar and insures an up and down movement of the cutterbar as the shoe or runner passes over irregularities in the surface of the ground, and the suspending chain 22 limits this movement within proper range.

In Figure 5 the apron 9 is omitted, and the tines 16' extend up to the front edge of the draper frame, and the supporting arm 17 is bolted at its front end to the cutter bar, and provided with a resilient and flexible shoe or runner 19' of spring steel or other suitable material, for the performance of the functions of the shoe portions 19' of the supporting arm 17 of Figure 1.

Having thus fully described our invention, what we claim as new and desire to secure by Letters Patent is:

1. In a harvester implement of the reciprocal cutter type, the combination with a relatively stationary supporting frame and a separate vertically movable cutter bar in advance of the frame, of a supporting arm attached to said cutter bar and pivoted to the frame, said arm having a ground shoe, a bracket arm mounted forwardly of the frame having a series of bolt holes, a chain attached to the forward end of the arm, and a bolt fastening said chain to the bracket arm.

2. In a harvesting implement the combination with a relatively stationary frame, and a separate vertically movable cutter bar in advance of the frame, of a supporting arm hinged to said frame and having a pair of spaced attaching lugs on the arm fixed to said cutter bar, an overlapping head on the arm frictionally engaging the cutter bar, and a flexible connection between said arm and a forward part of the frame.

HORACE D. HUME.
JAMES E. LOVE.